United States Patent [19]

Schleif

[11] 4,433,503
[45] Feb. 28, 1984

[54] FISH HOOK APPARATUS WITH COVERING BODY PORTION

[76] Inventor: George H. Schleif, 1450 Chestnut Ave., Carlsbad, Calif. 92088

[21] Appl. No.: 291,801

[22] Filed: Aug. 10, 1981

[51] Int. Cl.³ .................. A01K 83/00; A01K 85/00
[52] U.S. Cl. ................................. 43/42.1; 43/43.4
[58] Field of Search .............. 43/42.04, 42.1, 42.4, 43/42.41, 43.2, 43.4

[56] References Cited

U.S. PATENT DOCUMENTS

| | | | |
|---|---|---|---|
| 2,332,400 | 10/1943 | Richardson | 43/42.1 |
| 2,520,544 | 8/1950 | Hook | 43/43.4 X |
| 2,522,292 | 9/1950 | Modesto | 43/43.4 |
| 2,685,756 | 10/1954 | Mowbray | 43/57.1 |
| 2,981,027 | 4/1961 | Dewyer | 43/42.1 |
| 3,739,517 | 6/1973 | Schleif | 43/35 |
| 3,815,274 | 6/1974 | Schleif | 43/43.4 X |
| 3,849,928 | 11/1974 | Collins | 43/37 |

Primary Examiner—Nicholas P. Godici
Assistant Examiner—M. Jordan
Attorney, Agent, or Firm—Brown & Martin

[57] ABSTRACT

An integral and substantially rigid fish hook that may have multiple hook portions with a bob on the fish hook's shanks adjacent the eye of the fish hook, and with an enclosing body that covers the hook portions, which body has a forward, aligned and resiliently expandible opening for fitting around the shank between the bob and the eye, the opening or hole having a diameter smaller than the diameter of the bob for resiliently biasing the body to the forward position, and said body being movable on said shank to a retracted position with said hole being expanded and moved over the bob by the body being moved by a fish biting the body or contacting it forcefully, thereby allowing the hook portions to project through the body and hooking the fish.

9 Claims, 5 Drawing Figures

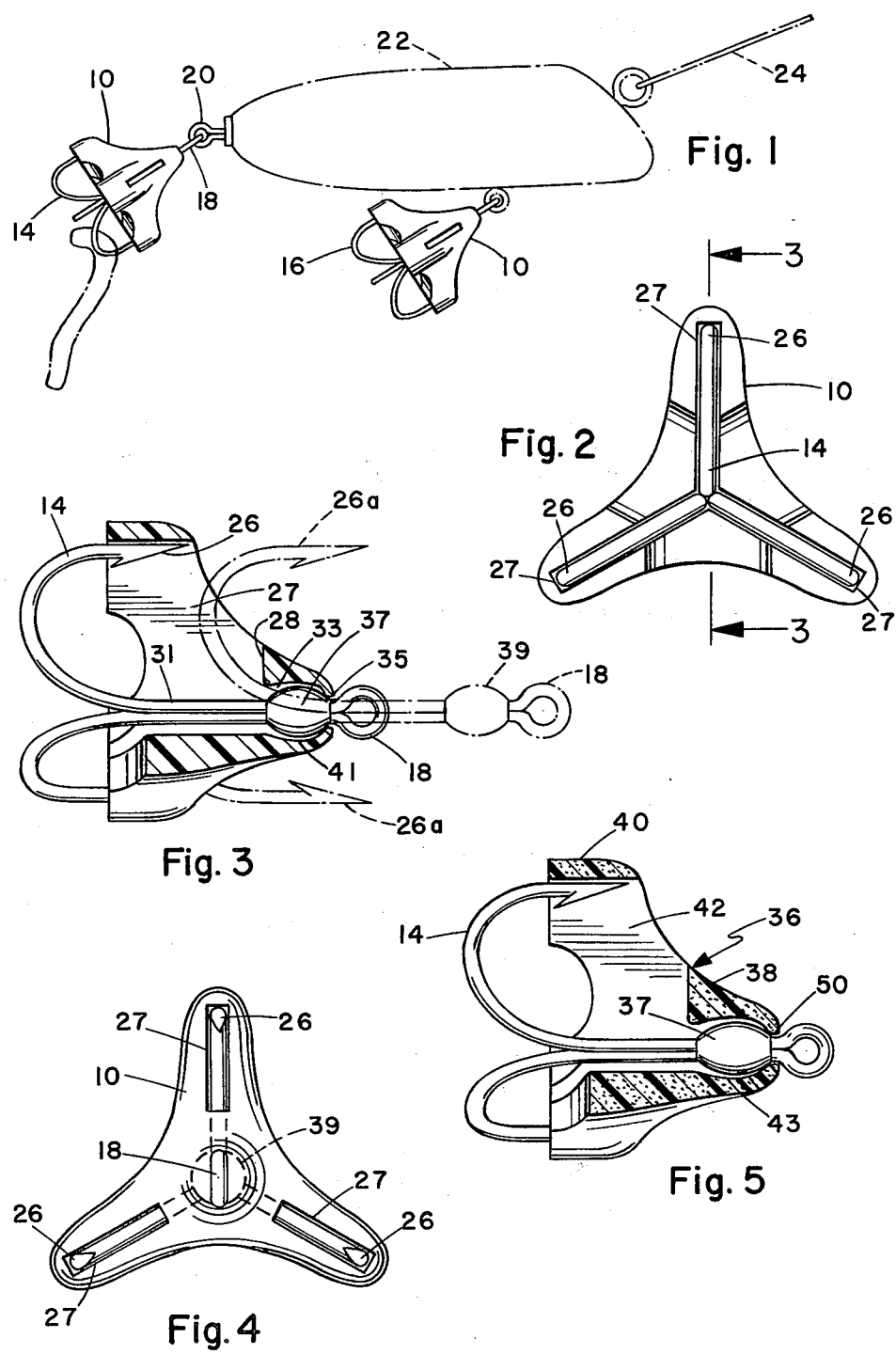

FISH HOOK APPARATUS WITH COVERING BODY PORTION

BACKGROUND OF THE INVENTION

In fishing, such as by trolling, casting or the like, plugs and other fishing lures are oftentimes moved through the water, which plugs or fishing lures have multiple hooks connected thereto. These attached fish hooks may comprise a fish hook with a single hook portion or with multiple hook portions, such as three hook portions spaced substantially equal distances apart. When such lures and suspended hook portions are pulled through the water, the hooks tend to hook onto weeds, logs, rocks and the like. Once the hooks make such contact and hook into the particular obstruction, then the fishing lures cannot be retrieved.

Thus it is advantageous to have a fish hook apparatus with a body that fits over the fish hook and the hook portion so that in normal movement through the water, and through weeds and around obstructions such as rocks and logs, the body portion shelters the hook portion from hooking into such obstructions. Yet the body portion has sufficient resilience or resilient force so that the body portion will move upon being bitten, grasped or forcefully contacted by a fish, so that the pointed end of the hook moves through the body and hooks the fish.

There are prior devices that provide related structures for doing this, such as are illustrated in my U.S. Pat. Nos. 3,739,517 and 3,815,274, and to a lesser degree as disclosed in U.S. Pat. Nos. 2,332,400; 2,522,292; 2,685,756; and 3,849,928. But my improved apparatus is different and has advantages over the foregoing, as will be apparent hereinafter.

SUMMARY OF THE INVENTION

In an exemplary embodiment of this invention, an integral and substantially rigid fish hook has a body mounted thereon that covers the hook portion of the fish hook. The body may take any of several configurations. In one configuration, the body portion is made of a plastic material that has a form holding structure. The plastic body or housing slides on the shank portion of the fish hook and has outer openings through which the hook portion of the fish hook moves and projects. The fish hook used in this embodiment normally has more than one hook portion, and the hook portions project in different radial directions. The body portion has an internal bore that encloses the shank of the fish hook and has an aligned and resiliently expandible end opening. The shank of the fish hook has a bob spaced from the eye that has a diameter larger than the end opening and over which the end opening expands, positioning the body portion on the hooks. When a fish bites the body portion, it causes a holding force to be exerted thereon that moves the body portion, snapping the opening over the bob, and projects the hook portions of the fish hook through the openings whereby the hook portions are able to contact the fish.

It is therefore an object of this invention to provide a new and improved fish hook apparatus having a body positioned on the rigid fish hook that protects the fish hook from hooking weeds, logs and the like in movement through the water and yet resiliently moves or deforms upon being bitten by a fish to expose hook portions of the fish hook to hook the fish.

Other objects and many advantages of this invention will become more apparent upon a reading of the following detailed description and an examination of the drawings, wherein like reference numerals designate like parts throughout and in which:

FIG. 1 is a side elevation view of an embodiment of the fish hook apparatus of this invention attached to a lure.

FIG. 2 is an enlarged end elevation view of an illustration of an embodiment of the basic fish hook apparatus, taken from the hook end.

FIG. 3 is a sectional view taken on line 3—3 of FIG. 2.

FIG. 4 is an end view tken from the attachment end.

FIG. 5 is a sectional view similar to FIG. 3, illustrating an alternate body construction.

Referring now to the drawings, the fish hook apparatus in an illustrative embodiment comprises a body portion 10 mounted on an integral and substantially rigid fish hook structure 14 and 16. The fish hook structure has multiple hook portions on a single shank, as is well known. The end of the shank portion of the fish hook has an eye portion 18 that, for example, allows the fish hook apparatus to be secured to normal mounting eyes 20 on fishing lures, such as plug 22, that is pulled through the water by a line 24.

In one embodiment, referring to FIGS. 2 and 3, the body 10 comprises a plastic material. The body 10 has a central passage 33 with an end opening 35 that is slidably mounted on the shank 31 of the fish hook structure 14. The end of the shank 31 has an enlarged portion 37 that is circular in shape and forms a bob for passing through the opening 35. The diameter of the bob 37 is about the same as the diameter of the eye 18 and is larger than the diameter of the end opening or hole 35. The hole 35 has a lip edge that is sufficiently elastic and flexible that it expands over the bob 37 that has generally conical shaped surfaces on each side along the length of the shank 31. The force required to move or snap the bob 37 through the lip of the hole 35 is not large, preferably a force of from 6–12 ounce pull, but is sufficient that it can be accomplished by a fish biting the body 10 and the fish hook apparatus 16. Yet the force required is sufficiently large that movement through the water or through weeds and the like is not sufficient to move the body 10 along the shank 31 and thus move the hole 35 over the bob 37. The body 10 has a plurality of openings 27 at its outer edge through which the pointed projections 26 of the hook portions of the fish hook project. The inner surface of the body 10 is curved as at 28, to allow maximum movement of the hook portions 26 through the openings 27.

In normal movement through the water, the contracted hole 35 has sufficient force to hold the body portion 10 in the forward position; that is the lips of the hole 35 are positioned between the bob 37 and the eye 18. When the fish bites the body 10, then the fish holds the body 10 against movement causing the lips of hole 35 to be moved over the bob 37. This causes the hook portions 26 to move in the direction of the dotted line position 26a to a point where the hook portion projects out sufficiently to hook the fish.

In a modified embodiment of FIG. 5, the structure and operation are substantially the same as that described relative to FIG. 3, with the exception that the body portion 36 is made of a resilient material such as foam rubber or the like. The foam rubber material 40 has a water impervious cover surface 38 that is smooth and does not leave air bubbles on the surface in movement through the water, and also has sufficient strength so as not to crush in normal movement through the water and over weeds, logs, rocks and the like. The body 36 has openings 42 through which the hook portions 48 of hook 46 move. The body 36 also has the opening or hole 50 that resiliently expands to snap over the bob 37 in the manner previously described. The cover surface 38 has sufficient strength and flexibility to resiliently biase the body 36 to the normal position illustrated in FIG. 5, and yet allow the body 36 to be moved by a fish biting the body 36 and hooks 14. In operation, when a fish bites the body 36, the body moves in the manner previously described to a point where the hook portion projects out sufficiently to hook the fish.

It is to be noted that the internal diameter of the passages 41 in FIG. 3 and 43 in FIG. 5 expand, so that the lips of hole 35 provide the predictable and controlled force required to move the body 10 or body 36 from the normal position of FIG. 5 to the extended position illustrated in dotted lines in FIG. 3. In further operation, an appropriate bait, such as worms or salmon eggs, are placed on the hooks 14 when the body 14 is moved forward a sufficient distance where the hole 35 is moved over the eye 18, thus exposing the full ends of the hooks 14. The body 10 and hooks 14 are then cast into the weeds and when it leaves the weeds the bass or the like sees the bait and thus the bass makes its strike. It is to be recognized that the bodies 14 and 36 can be bonnets that have appropriate outer colors and shape to form separate fishing elements for being attached to plugs, such as is illustrated in FIG. 1. Thus the bonnet 10 can be bouyant and thus be a floater, or it can be weighted to go to the bottom. In this regard, the bob 37 that holds the bonnet 10 on can be weighted with the normal construction of the body of bonnet 10 to make the forward end and the ends of the hooks go downward.

Having described my invention, I now claim:

1. A hook apparatus for being pulled through the water comprising:

an integral and substantially rigid fish hook having an eye and a hook portion on a shank, a body for being mounted on said fish hook and covering the pointed end of said hook when the body is in a normal position, said body comprising a lure shaped housing of resilient material slidably mounted on said shank of said fish hook and having an opening in the side thereof for said hook portion to pass therethrough when said body is moved from said normal position to a second position, said shank having an enlarged portion formed integrally thereon adjacent said eye, which enlarged portion forms a bob, the upper end of said body having a resiliently expandable hole being formed by a relatively thin continuous annular upper end body wall through which said shank passes, with the diameter of said hole being smaller than the diameter of said bob and the diameter of said eye, said body being in the normal position on said fish hook when said upper end hole fits between said eye and said bob, and said upper end hole being movable over said bob for moving said body to said second position and exposing said hook portion upon said body being bit or contacted forcefully by a fish when the hook apparatus is being moved through the water.

2. A fish hook apparatus as claimed in claim 1, wherein:

said fish hook comprises multiple hook portions secured to a common shank, and said bob being mounted on the common shank.

3. A fish hook apparatus as claimed in claim 2, wherein:

said body has multiple openings in the side thereof for said multiple hook portions to pass therethrough.

4. A fish hook apparatus as claimed in claim 1 in which, said bob has inclined opposite surfaces along the length of said shank for expanding said upper end hole in moving said body along the length of said shank.

5. A fish hook apparatus as claimed in claim 4 in which, said bob is spaced from said fish hook eye a distance slightly larger than that sufficient to receive said upper end of said body.

6. A fish hook apparatus as claimed in claim 4 in which, the diameter of said bob and the diameter of the fish hook eye being about equal.

7. A fish hook apparatus as claimed in claim 4 in which, the force on said body required to move said upper end hole over said bob being about 6 to 12 ounces.

8. A fish hook apparatus as claimed in claim 1 in which, said body comprising a plastic material that is impervious to water.

9. A fish hook apparatus as claimed in claim 1 in which, said body comprises a resilient foam material having an outer skin cover that is water impervious and has a surface sufficiently smooth that said body does not create bubbles in moving through the water, and said skin has sufficient strength not to be crushed during normal movement through the water.

* * * * *